United States Patent [19]
Martin et al.

[11] Patent Number: 5,450,545
[45] Date of Patent: Sep. 12, 1995

[54] GENERATION OF RULES-BASED COMPUTER PROGRAMS USING DATA ENTRY SCREENS

[75] Inventors: Robin V. Martin; Michael G. Moulton, both of Portsmouth, United Kingdom

[73] Assignee: International Business Machines Corporation, Armonk, N.Y.

[21] Appl. No.: 918,983

[22] Filed: Jul. 23, 1992

[30] Foreign Application Priority Data

Aug. 28, 1991 [EP] European Pat. Off. ............ 91306908

[51] Int. Cl.⁶ .............................................. G06F 15/20
[52] U.S. Cl. .............................. 395/700; 364/DIG. 1; 364/280.4; 364/280.7; 364/286; 364/286.1; 364/286.2
[58] Field of Search ................. 398/700; 395/700; 364/280.4, 280.7, 286, 286.1, 286.2

[56] References Cited

U.S. PATENT DOCUMENTS

| | | | |
|---|---|---|---|
| 4,816,994 | 3/1989 | Freiling et al. | 395/75 |
| 4,892,766 | 12/1990 | Derr et al. | . |
| 5,187,788 | 2/1993 | Marmelstein | 395/700 |
| 5,233,513 | 8/1993 | Doyle | 354/401 |

OTHER PUBLICATIONS

Campbell; "dBASE IV 1.5 Handbook"; Bantam; 1992.
"A Specification Compiler for Business App: Space", by Harada, IEEE COMPSAC 87 Proceedings.
"Do It Yourself Prototyping", by Sleurung, Technische Rusidschaw, 41/88, vol. 80.
"Production of Customized Programs by Questionnaire and Decision Tables", by Connors, et al, IBM TDB, vol. 13, No. 11, Apr. 1991.
"Decision Table Processing" by Davis, IBM TDB, vol. 14, No. 9, Feb. 1972.
"Recursive Decision Table Translator", by Sharman, vol. 14, No. 12, May 1972.
"Expert System Shells Prototyping and Beyond" by Tong, Third IEEE/CHMT, Oct. 1987.
"An Incidence-Matrix-Driven Panel System for the IBM CPC", by Halpem, et al, IBM System Journal, 26 #2, 1987.
"Generation of File Processing Programs Based on JSP" by Engmann, et al, Software-Practice and Experience, vol. 19(4), Apr. 1989.

*Primary Examiner*—Kevin A. Kriess
*Assistant Examiner*—Jonathan Hall Backenstose
*Attorney, Agent, or Firm*—Lauren C. Bruzzone; Louis J. Percello

[57] ABSTRACT

A method and system for generating a rules-based computer program employs an interactive workstation to display input data format screens. These screens are edited on the workstation to define the formats of all permissible items of input data to the program and the formats are stored. The workstation then displays rule entry screens in decision table format on which the program designer defines the rules relating to the processing of associated input data items. The completed decision tables are stored and together with the stored input data formats are compiled to produce computer program code for run-time execution or interpretation.

18 Claims, 19 Drawing Sheets

FIG. 4

```
                                                                    MAIN
                                                                   3  2 ─

Enter       F1=Help         F10=Actions              Esc=Cancel
.F1=Help  F3=Exit  F4=DefCon  F5=DefHiCon  F6=DefVar  F8=Edit  F10=Delete .
```

FIG. 5

```
Rules                                                              MAIN
                                                                  —16  5—

Technical Library Manual Order Form

Manual Number

Quantity

Order for ( name )

Department/Location

Enter              F1=Help             F10=Actions       Esc=Cancel
 .F1=Help  F3=Exit   F4=DefCon  F5=DefHiCon  F6=DefVar  F8=Edit  F10=Delete.
```

FIG. 6

```
                                                              MAIN
    ┌─────────────────────────────────────────────────────────────┐
    │         Technical Library Manual Order Form                 │
    │                                                             │
    │  Manua                                                      │
    │         ┌─────────────────────────────────────────────┐     │
    │         │ Field references variable  MANNUM        1  │     │
    │  Quant  │                                             │     │
    │         │  Row 7    Col 49    Length 10               │     │
    │  Order  │  Attrs :  Optional Mandatory Protected      │     │
    │         │           Date Alpha Mixed Numeric Integer Currency│
    │  Depar  │           Signed Unsigned                   │     │
    │         │           Upper Lower Asis                  │     │
    │         │                                             │     │
    │         │  AutoSkip        : No Yes                   │     │
    │         │  Initial status : Active Inactive           │     │
    │         │  Force M/L      : No Yes                    │     │
    │         │                                             │     │
    │         │  Initialised to :                           │     │
    │         └─────────────────────────────────────────────┘     │
    │                                                             │
    │                                                             │
    │  Enter               F1=Help           F10=Actions    Esc=Cancel │
    │  .F1=Help  F3=Exit   F4=DefCon  F5=DefHiCon  F6=DefVar  F8=Edit  F10=Delete. │
    └─────────────────────────────────────────────────────────────┘
```

FIG. 7

```
Rules                                                              MAIN
                                                                   16 49
─────────────────────────────────────────────────────────────────────────

Technical Library Manual Order Form

Manual number . . . . . . . . . . _____

Quantity  . . . . . . . . . . . . ____

Order for (name)  . . . . . . . . _____

Department/Location . . . . . . . _____

─────────────────────────────────────────────────────────────────────────
Enter              F1=Help           F10=Actions              Esc=Cancel
 F1=Help  F3=Exit  F4=DefCon  F5=DefHiCon  F6=DefVar  F8=Edit  F10=Delete .
```

```
Profile  Rules  Tutorial  Delete  Notes  Sort                    MULT
                                                                 3  2
              Example multi-line panel Question 1  . . . . . . . . . . . . . . . . . . . . . . _____
Question 2  . . . . . . . . . . . . . . . . . . . . . . _____
Question 3  . . . . . . . . . . . . . . . . . . . . . . _____

Answer 1            Answer 2                    Answer 3
. . . . . . .       . . . . . . .               . . . . . . .
. . . . . . .       . . . . . . .               . . . . . . .
. . . . . . .       . . . . . . .               . . . . . . .
. . . . . . .       . . . . . . .               . . . . . . .
. . . . . . .       . . . . . . .               . . . . . . .
. . . . . . .       . . . . . . .               . . . . . . .
↑ ↑ ↑ ↑ ↑ ↑ ↑       ↑ ↑ ↑ ↑ ↑ ↑ ↑               ↑ ↑ ↑ ↑ ↑ ↑ ↑

Total : MMMMMMMMM

Enter 1=Hlp  3=Exit  4=Top  5=Bot  6=PgUp  7=Up  8=Down  9=PgDn  10=Actns  Esc=Cncl
.F1=Help  F3=Exit   F4=DefCon  F5=DefHiCon  F6=DefVar   F8=Edit   F10=Delete.
```

```
 Profile  Rules  Tutorial  Delete  Notes  Sort                          MULT Question 1 . . .    ┌─────────────────────────────────┐
                     │ Field references variable  VAR2 │
 Question 2 . . .    │ Col 26              Length  10  │
                     │ Alignment :   Left Right        │
 Question 3 . . .    └─────────────────────────────────┘

Answer 1                  Answer 2                  Answer 3

........                  ........                  ........
  ↑↑↑↑↑↑↑                   ↑↑↑↑↑↑↑                   ↑↑↑↑↑↑↑

Total : MMMMMMMM

Enter 1=Hlp  3=Exit  4=Top  5=Bot  6=PgUp  7=Up  8=Down  9=PgDn  10=Actns  Esc=Cncl
 .F1=Help   F3=Exit    F4=DefCon    F5=DefHiCon    F6=DefVar    F8=Edit    F10=Delete.
```

FIG. 10

. Create  Copy  Delete

Rule Table Selection

Displayed in the selector list to the right are the names of the decision tables defined for the current panel.

Use the cursor keys to select the table you wish to edit and press Enter.

Press F10 for 'Actions'

Use 'Help' for more info.

```
┌Slct table to edit┐
│ 1. Exit1         │
│ 2. Exit2         │
│ 3. Exit3         │
│ 4. Exit4         │
```

On a display panel tables 1 to 4 are always present (though may be empty) and are invoked at the following points :-

1. Initialisation (before panel is first shown)
2. Data entry (each time the Enter key is used)
3. Data accepted (no errors found in table 2)
4. Exit from panel On a file definition type panel (FileDef) tables are called explicitly.

.F1=Help        F3=Exit              F10=Actions              Esc=Cancel.

FIG. 18

| Data Dictionary Editor | | | | Group = ISEDEMO |
|---|---|---|---|---|
| 1 | 1 | LASTRUN | 8 | C |
| 2 | 9 | RUNCOUNT | 4 | C |
| 3 | 13 | OUTWORD | 8 | ONS |
| 4 | 21 | TEMP | 8 | I |
| 5 | 29 | QTY | 8 | I |
| 6 | 37 | APP1 | 3 | P |
| 7 | 40 | APP2 | 3 | P |
| 8 | 43 | APP3 | 3 | P |
| 9 | 46 | NEW | 3 | C |
| 10 | 49 | RLNGTH | 14 | N11.2 |
| 11 | 63 | TESTDATE | 8 | D |
| 12 | 71 | TEMPSTR | 30 | C |
| 13 | 101 | | 1 | C |

F1=Help    F3=File      Esc=Cancel

FIG.19

```
Data Record Editor                            Group = ISEDEMO
LASTRUN    = 45
RUNCOUNT   = 46
OUTWORD    =
TEMP       = 00000452
QTY        = 00000452
APP1       = 40
APP2       = 30
APP3       = 30
NEW        = 6
RLNGTH     = 00000000400.00
TESTDATE   = 19910720
TEMPSTR    = 19900909
           = x F1=Help    F3=File    F6=Output    F9=Attr    Esc=Cancel
```

GENERATION OF RULES-BASED COMPUTER PROGRAMS USING DATA ENTRY SCREENS

TECHNICAL FIELD

The invention relates to a method and to a data processing system for generating a rules-based computer program.

BACKGROUND OF THE INVENTION

Most computer programs are written directly in a programming language by a skilled programmer. To ease the task of the programmer, so-called "high-level" languages, such as "BASIC", "COBOL" and "C", are available which allow the programmer to write his source code in relatively easily understood natural language expressions. Such source code is converted by a compiler program to machine level instructions (object code) which are capable of direct execution by a digital computer. More difficult low level assembler languages are available whose instructions are closer to those of the actual computer. Assembler language source code is converted into executable instructions by an assembler program, which is much simpler than a compiler. Some languages are also designed to be directly interpreted at run-time by an interpreter program without prior compilation or assembly.

Whichever type of language is used, the programmer needs to know the syntax and functions provided by the programming language as well as to have a clear and detailed understanding of the task or application the program is to perform.

Various tools exist to assist the programmer in efficient production of program code but there is an increasing need for tools which enable non-programmers with detailed knowledge of an application to produce working program code (specifically a COBOL program) from non-procedural terminal inputs. However, the amount of analysis and understanding of the detailed program structured required is still substantial.

In cases where there is a specific application, special purpose programs are available which provide a user interface tailored to the nature of the application. So called "spreadsheet" programs are an example, enabling the manipulation of tabular data and the performing of financial or arithmetical calculations on the contents. In a sense, the user is creating a customized procedure analogous to a program.

One area in which advances have been made is in the field of Expert Systems. In this area, it is well recognized that the creation of an expert system computer program is advantageously split between the computer programmer and a knowledge engineer whose job is to determine the rules for providing expert advice in a particular field. In some cases, an actual expert in the field can replace the knowledge engineer.

Initially, the programmer was responsible for coding the rules or knowledge base into the program but current expert systems more typically provide both "developer interfaces" and "user interfaces". The "developer interfaces" allow the non-screen interactive entry of rules by a developer who is not necessarily a programmer. The "user interface" is the interface presented to the end-user who needs the expert advice. Several such systems are described in the book "Expert Systems—Tools and Application" (P. Harmon, et al.; Wiley, 1988).

U.S. Pat. No. 4,891,766, entitled "Editor For Expert Systems", describes a system in which the expert (designer) is led through a series of screens which allow editing of "classes" of input information, editing of "rules" and the placing of the rules in hierarchy ("rule tree"). However, only single rules are processed at a time and their relationship to other rules is only visible to the expert when the "rule tree" is displayed. Even then, the rules are only represented symbolically in the rule tree and are not displayed in full.

As used herein, the term "rules-based program" is not intended to be limited to the field of expert systems but to any programming application in which human expert knowledge, expressible as set of rules, is fundamental to the creation of the program.

A technique for expressing program logic known to programmers is the "decision tablet". This is a sort of truth table in which conditions set out in one quadrant are evaluated and the logical possibilities which are the outcome of the evaluations are set out in columns in an adjacent quadrant. If the logical possibilities in a given column are satisfied, then appropriate actions listed in another quadrant of the table are carried out.

Decision tables are discussed in articles by M. M. Conhers, et al., (IBM Technical Disclosure Bulletin, Vol. 13, No. 11, April 1977, pp 3384), R. A. Davis (IBM Technical Disclosure Bulletin, Vol. 14, No. 9, February 1991, pp 2845) and G. A. Sharman (IBM Technical Disclosure Bulletin, Vol. 14, No. 12, May 1972, pp 3747). Although these articles recognize the possibility of writing programming statements in the form of decision tables and executing the tables during running of a program, use by non-programmers and the user interface for creation of an application and the input of data to the application and the input of data to the application is not described.

SUMMARY OF THE INVENTION

The problem with any specific application is to select an interface best suited to the needs of the specific application. There remains a need for a non-programmer developer interface which is both user friendly and productive in allowing speedy development of a working rules based application program.

Accordingly, the present invention in one form is a data processing system for generating a rules based computer program, the system comprising: an interactive workstation having a display device, operator input means and a data store; and a designer program for execution on the workstation, the designer program including an input data format editor for enabling editing oil the display via the operator input means of the format of items of input data and for storing the editing on the display via the operator input means of a plurality of rules associated with one or more of the input data items and for storing the edited rules in the data store, the rules being displayed for editing and storage in a decision table format; and a compiler for compiling the stored input data formats and decision tables to produce computer program code for run-time execution or interpretation for interaction with the user through an expert system and command interaction file.

The invention may also be regarded as a method of generating a rules based computer program on an interactive workstation having a display device, operator input means and a data store, comprising the steps of: displaying a plurality of input data format screens on the display device; editing each input data format screen by means of the operator input means to define the formats of all permissible items of input data to the program; storing the edited input data formats in the data store; displaying a plurality of rule entry screens, in decision table format, each screen being associated with one or more of the input data items; editing each rule entry screen to define rules related to the associated input data items as decision tables logically relating conditions and actions by means of a pattern of logic values; storing the completed decision tables in the data store; and compiling the stored input data formats and decision tables to produce computer program code for run-time execution or interpretation.

The employment of decision tables at the developer interface has been found to assist the expert developer in that several rules associated with a common task may be viewed at at the same time. The entry of rules is not broken down to so basic a level that their interrelationship is lost.

One potential application of the invention is itself an end-user interactive application program in which panels will be displayed to an end user. In this case, a general layout is preferably displayed to the developer and the editing step includes creating and positioning fields for input data items within the panel layout and subsequently defining further attributes of each input data item by means of a separate variable definition step.

The generated program may be conveniently structured as a series of such panels in which case at minimum there is a decision table associated with initialization of the panel and a decision table associated with exit from the panel. Preferably, those panels associated with input data items also have data entry and data acceptance decision tables.

Employing the basic set of decision tables with each panel has been found to facilitate logical development of the application program. Such panel based programs need not necessarily be expert systems, in the sense that the end-user necessarily seeks advice in a consultation session but could, for example, be an electronic form or survey program in which a rules base compiled by the form or survey owner is needed to assist the end-user through the program. In such cases, a files of output data is likely to be required and a feature of the invention provides for the display and editing of the format of the output data files produced by execution of the program.

Another potential application of the invention is to process a stream of input data records. In this case, the input data format screens correspond to respective input data record types in the data stream and the editing step comprises a definition of the length, position and attributes of fields within the data record to produce a data dictionary for that type of record.

The input data records might, for example, be transactions from a commercial establishment such as a bank or stock exchange where the rules underlying whether the transaction are valid and what should be done with them again demand expert knowledge which can be advantageously entered by means of the decision table interface. The application might be to the processing of real transactions in a simple case or to the simulation of a central transaction processor for test purposes.

In this application too, creation of an output data stream is likely to be required and the preferred feature of the invention allowing the display and editing of output data file format by the developer will again be useful.

Although it may be theoretically possible within the scope of the invention to compile the entered formats and decision tables directly into machine executable code, it is preferable to compile these into pseudo-code for subsequent execution by a run time interpreter so that identical execution on a number of platforms can be guaranteed.

The interpreter is preferably available on the workstation to enable testing of the program by the designer but a mainframe system version is used to run the finished program for the end-user.

BRIEF DESCRIPTION OF THE DRAWINGS

The invention will now be described, by way of example only, with reference to two preferred embodiments thereof as illustrated in the accompanying drawings, in which:

FIG. 4 shows a blank panel editor screen awaiting input by the form designer.

FIG. 5 shows the panel editor screen of FIG. 4 with consistent data entered.

FIG. 6 shows the screen of FIG. 5 with a superimposed window for defining a variable.

FIG. 7 shows the panel editor screen after completion of the form design.

FIG. 8 shows an example of a panel editor screen displaying a multi-line panel.

FIG. 9 shows the screen of FIG. 8 with a superimposed window for defining a multi-valued variable.

FIG. 10 shows one general example of a decision table list screen associated with a panel.

FIG. 18 shows a data dictionary editor screen.

FIG. 19 shows a data record editor screen.

DETAILED DESCRIPTION OF THE INVENTION

Two preferred embodiments of the invention will be described.

1. Document Adviser System

The first preferred embodiment of the invention is described in the context of an overall system known as the Document Advisor (DAD) system which includes not only a system and method for generating a computer program according to the invention but also the end-user application of the program.

The DAD system is aimed at facilitating the generation and processing of office forms and related documents. The system comprises an interactive workstation and a rule-based computer program that can substantially automate the routine processing of many-types of administrative forms and other such documents. DAD is able to provide expert assistance to a user filling in a form. All input data is automatically checked for validity against an internal knowledge-base of facts and rules, and the end-user is advised, through an interactive windowing facility, of any discrepancies which need correcting before the application can proceed.

Output from the system can be hardcopy and/or an electronic file of data which can be used as input to other applications. The system is designed to be user friendly, and quite complex forms can be designed and tested by a person who does not necessarily have programming expertise.

The DAD system includes an interactive workstation (such as the IBM PS/2 TM computer) on which the form owner can design the layout of a form using a "WYSIWYG" (what you see is what you get) screen editor. All variables can be named and referenced in a rules set which is defined to the knowledge-base as a series of decision tables. Full facilities are provided for testing and proving the application on the workstation and, only when deemed satisfactory, is the generated application uploaded to a mainframe system for access by the end user. A suitable mainframe system might be an IBM System 370 TM processor running the VM/SP (Virtual Machine/System Product) program. User interaction with such a system is through a video display terminal using the CMS (Conversational Monitor System) which is part of the VM/SP system.

Figure 1:
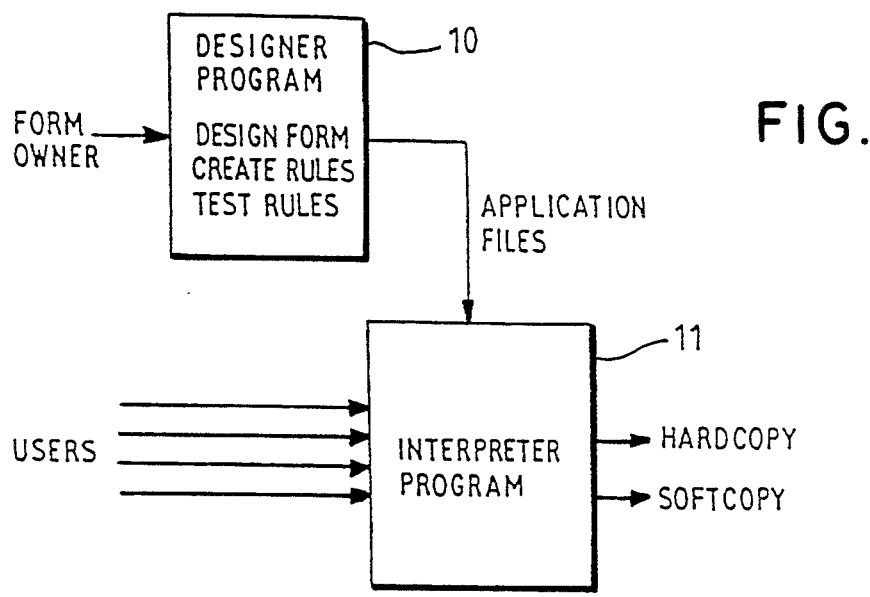
FIG. 1 is a schematic diagram showing the inputs to and outputs from a designer program, forming part of a system according to the invention, and an interpreter program, in a form processing application.

The main program components of the DAD system are the Designer 10 and the Interpreter 11 as shown schematically in FIG. 1. The Designer is a program that permits a form to be designed, the relevant rules to be created and tested and the end result output as two application files. As illustrated, these files are then executed by the Interpreter on a VM/CMS host system during an end-user session.

A key feature of the Designer is that no programming skill is necessary to use it and develop a working program. All that is necessary is familiarity with the operation of a computer or word processor terminal or the like. This gives a non-programming professional the ability to change the rules relating to the application without requiring the services of programmers, and in effect gives the form owner complete autonomy and control over his own business environment. The DAD system thus allows a business process to be run according to a prescribed set of rules that can be established, maintained and audited by the business process owner, without recourse to external programming skills.

The rules governing how a particular form is to be completed are held as a series of decision tables as it is believed that this format is readily understandable by non-programmers. These tables are maintained by the person owning that form. During an end-user (consultation) session, every occurrence of the form is fully checked in accordance with these rules.

Figure 2:
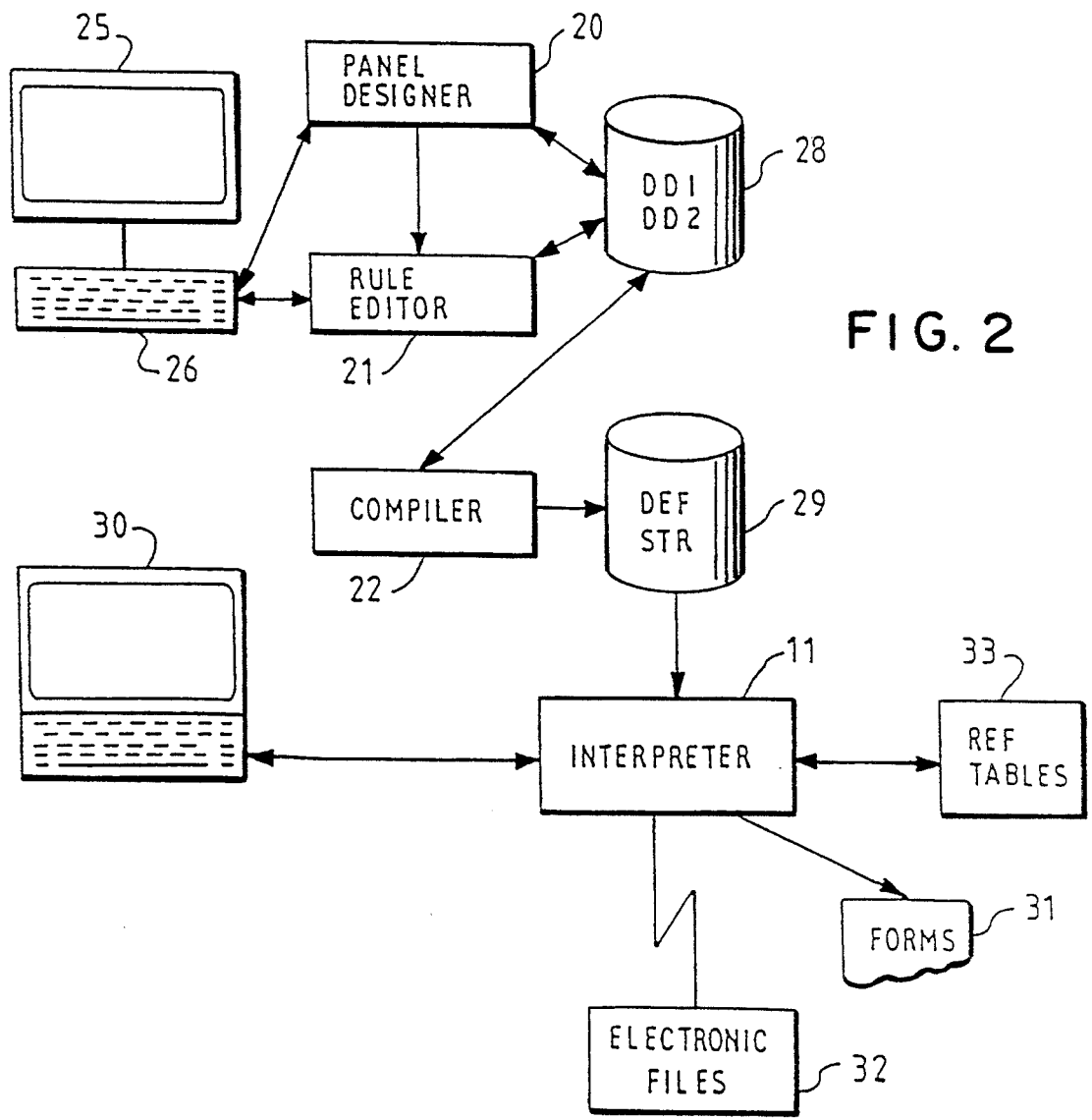
FIG. 2 is a more detailed schematic of the overall forms processing system partially illustrated in FIG. 1.

A more detailed schematic of the DAD system is shown in FIG. 2. The main program components of the designer program 10 are a Panel Designer 20, a Rule Editor 21 and a Compiler 22. Also shown is the Interpreter 11 in the host system.

The three program modules 20, 21 and 22 are resident in main memory of an interactive workstation, such as an IBM Personal System/2 TM computer. They interact with the application developer (expert) via the display monitor 25 and the keyboard 26 of the workstation. (The keyboard is a conventional keyboard comprising alphanumeric function and "enter" keys). The files defining each panel produced by Panel Designer 20 and the decision tables produces by Rule Editor 21 are stored as Definition files 28 in the workstation disk storage from which they may be retrieved for editing.

The Panel Designer

Each application is divided up into a number of display panels, and the Panel Designer allows these panels to be designed to basic Common User Access TM (CUA TM) specifications using WYSIWYG panel screen editor. CUA TM is part of IBM Systems Application Architecture TM and CUA TM specifications are described in a document entitled "Common User Access—Basic Interface Design Guide" (Ref. No. C26-4583) published by IBM Corporation. The editor is used to define the fields on the panel (action bar areas and function keys are pre-defined according to panel types) and both constant and variable fields are created by selecting from lists in pop-up panels. Fields can be moved or deleted with a single key action. For input fields, the type of data can be specified and basic input checking can be specified for dates, numbers, etc. All CUA TM panel-types are supported, namely:
Information
Single-choice
Multiple-choice
List processing
Logo
Entry (simple entry and multi-line entry)

The editor is also used to define the format of output files, with options for creating print files (page numbering, running headers and footers, etc.) In this case, the size constraints of a normal panel are relaxed through the output files are still flat (two dimensional) files.

Completed panels and output files formats are held as Definition files 28. The function of the Panel Designer will be described further in connection with the operation of the system.

Rules Editor

The rules editor 21 enables the creation by the developer of a rules-base by entry of decision tables via the workstation. The basic layout of a decision table is as follows.

| Conditions area | Condition selection |
|---|---|
| Commands area | Commands selection |

Each table can accommodate many rules. Any conditions that are used by any of the rules are put in the Conditions area, each to its own line. The same condition can be used by several rules and only has to appear once in this area.

Any commands that are used by any of the rules go in the Commands area. The same commands can also be used by several rules.

Figure 11:
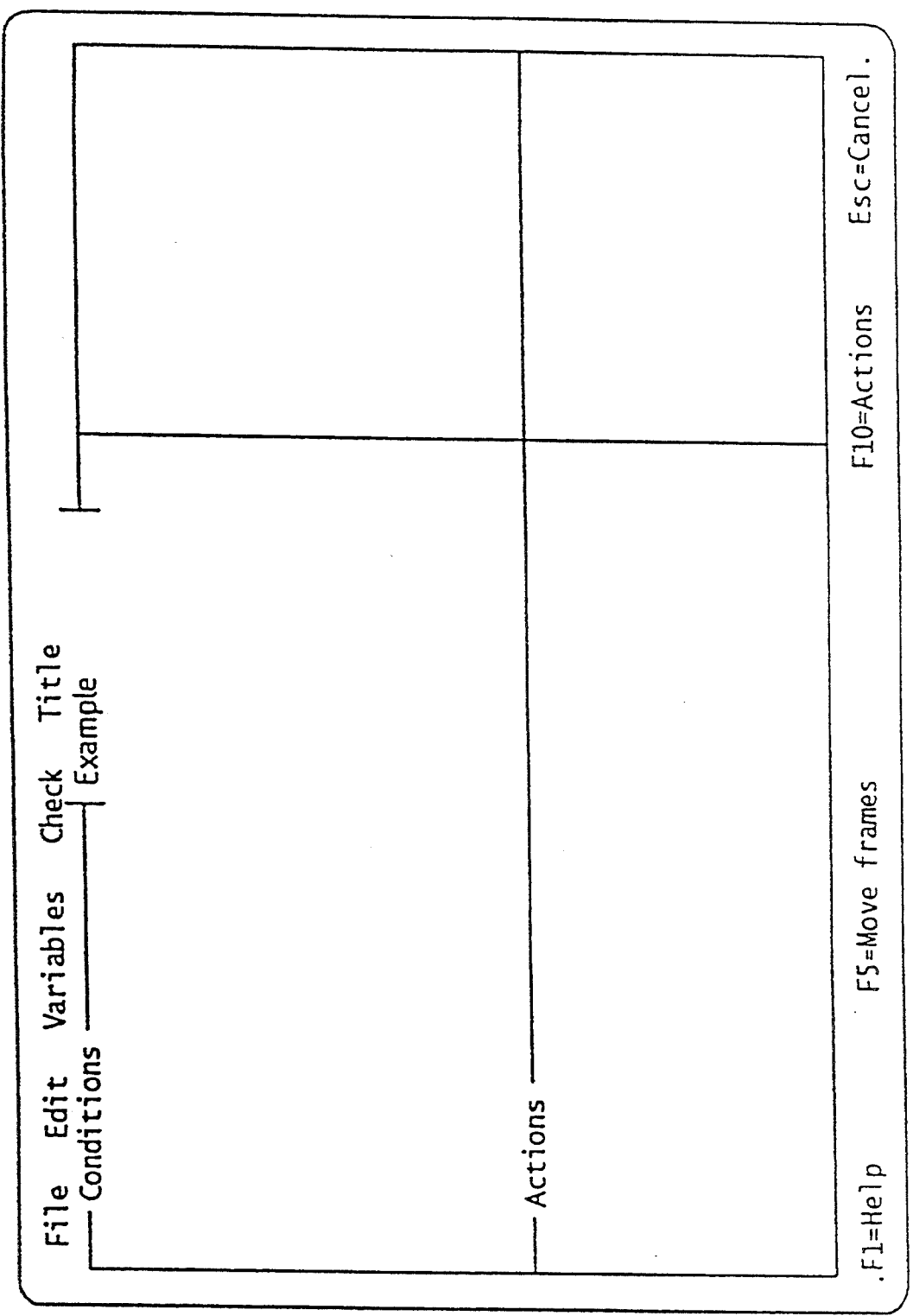
FIG. 11 shows a blank decision table editor screen selected from a decision table screen of the type shown in FIG. 10.
Figure 12:
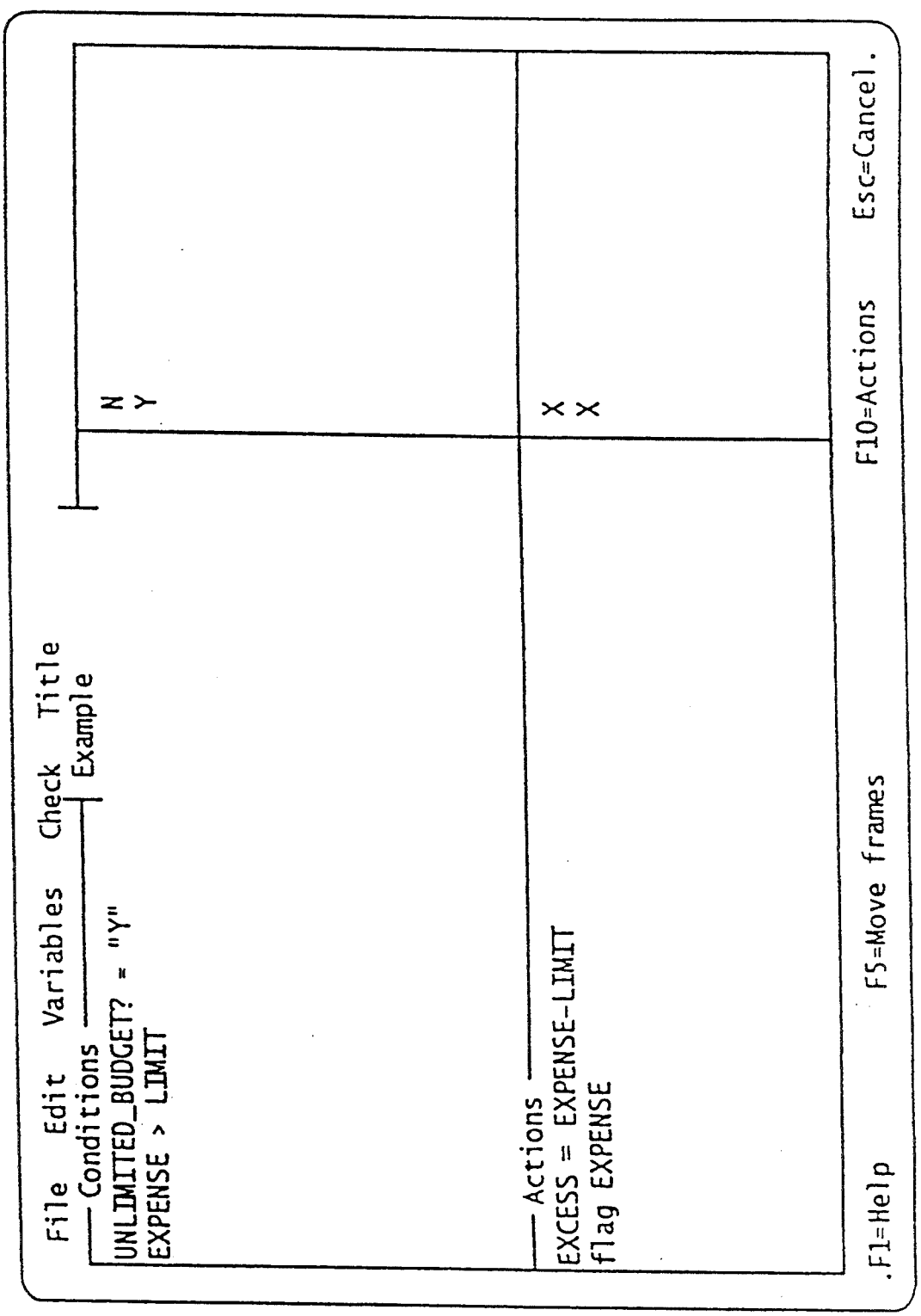
FIG. 12 is an example of a decision table editor screen onto which a simple decision table has been entered.
Figure 13:
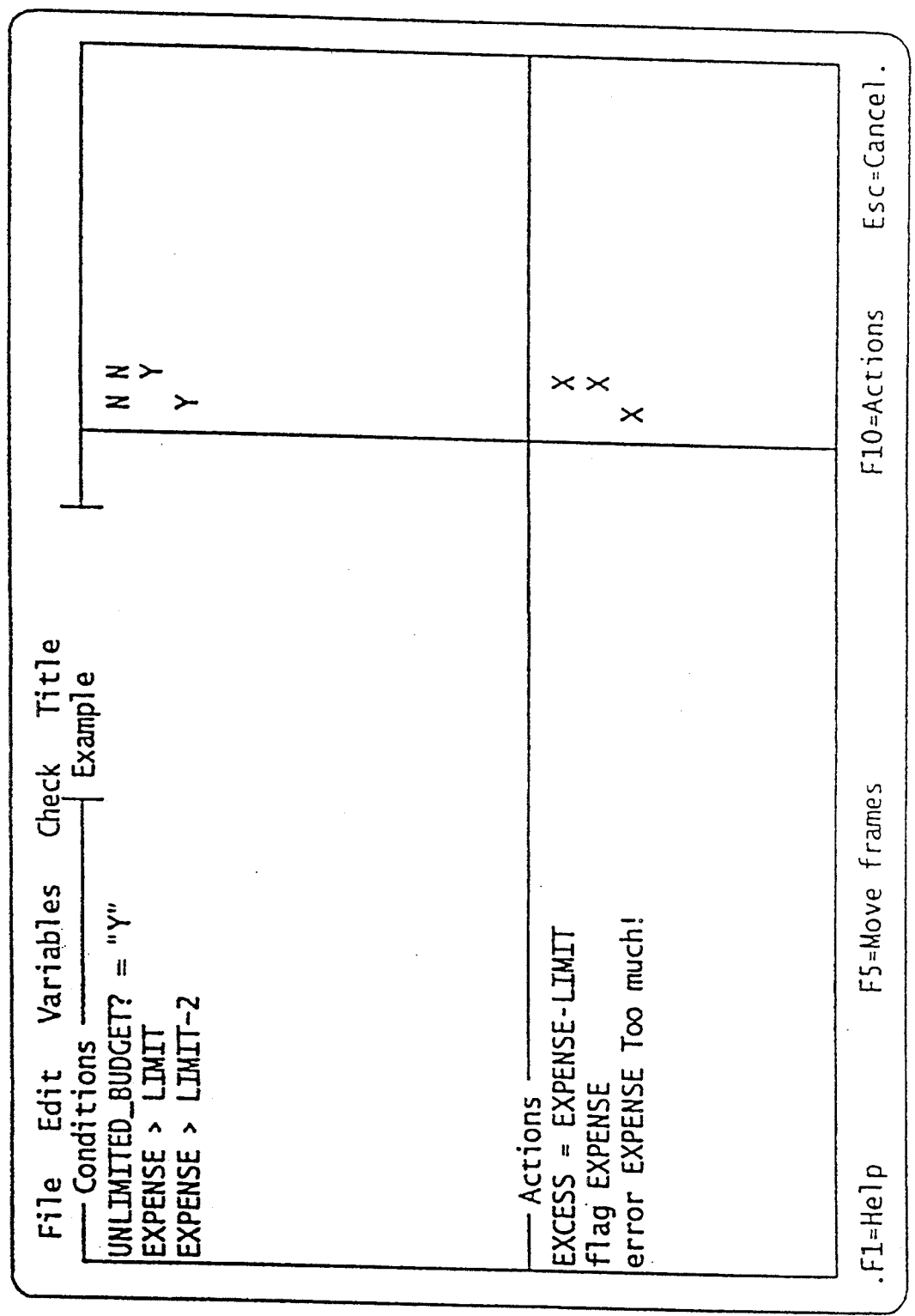
FIG. 13 is an example of a decision table editor screen onto which a more complex decision table has been added.

The two right hand boxes define the selection criteria for the rules. Each rule is a vertical column running down through the two boxes. In this column can be various symbols, Y or N in the top half, X in the bottom. Wherever a symbol occurs, the command or condition that is level with the symbol (i.e., on the same row), is associated with the rule. The symbols in the top half have a dual purpose. As well as defining which conditions are associated with the rule, they specify the necessary outcomes of those conditions for the commands to be carried out. A 'Y' indicates that the condition must be true, a 'N' indicates that the condition must be false. Examples of actual decision tables occur in the following description of operation of the system and are illustrated in FIGS. 11, 12 and 13.

Decision tables are the means by which the DAD system processes information. They are also used for determining which panel is to be displayed next, and for instructing the system to perform various functions such as saving data, and error checking. For complex logic, tables may call other tables, which in turn can call others, etc. There are facilities to call a table a fixed or variable number of times, or until a specified condition is met.

Each decision table belongs to a particular panel. Each panel can have many decision tables defined for it which are called up at different times. However, there are four possible different times or process points for a panel at each of which a specific type of decision table is processed. This will be further described below.

For all except multi-line panels, each exit is normally called once, but for multi-line panels exits 2 and 3 are called for each line of input until the user exits from the panel. Each table can call other tables to a maximum of 255 per panel.

A special editor is provided to facilitate operation and modification of the decision tables.

The Compiler

The application definition data (panels and tables) in files 28 are compiled by the compiler 22 into pseudo-code 29 ready for subsequent access by the run-time executor (interpreter 11).

Two files (DEF and STR) are produced. The DEF file contains control data and is uploaded to the mainframe CMS system in binary format. The STR file contains all constant data and is uploaded as a text file so that data is translated from ASCII to EBCDIC characters, which are used on mainframe terminals.

The compiler processes decision tables sequentially, changing each table into a number of "IF condition(s) THEN action(s)" statements known as production rules. Within each decision table, rules are compiled (and subsequently evaluated) column by column from left to right in the condition and commands selection half of the table. Selected commands are executed from top to bottom of the table.

The Interpreter

The interpreter 11 is a run-time program that executes the pseudo-code application files in a host system, to provide the end-user consultation environment. It interacts with the end user via a mainframe terminal 30 and accesses communal information files 33 which hold lookup tables and other data needed by the decision tables.

Completion of the consultation session results in the generation of the appropriate hardcopy (31) and/or electronic (32) files of data, suitable for sending to other systems.

A version of the interpreter program (not shown) is also resident on the workstation in order to permit testing of the application program during development. This has many facilities which are not applicable to the end user (eg., table inspection).

Operation

Following the above description of the overall structure of the DAD system, the operation of the Designer program 10 to develop a form processing application will now be described with reference to sample screens displayed to the application developer and the flow diagram of FIG. 20. Various more detailed aspects of the program structure will become apparent.

The basic procedure for creating a new application can be divided up into a number of steps. A typical sequence is as follows:

1. Design panel list;
2. Design panels including definition of variables;
3. Add decision tables for the currently highlighted panel;
4. Define output files;
5. Make Help and other text files;
6. Create lookup tables of values that may need to be referred to during an application;
7. Test the application using the Interpreter;
8. Compile and upload the application files.

It should be understood that this sequence need not be followed exactly and that it is possible to break off from one action and go to another at will. Thus, the method steps of FIG. 20 are also illustrative of a typical program design sequence and are not inevitably followed in the exact order shown.

Panel Designer

Figure 3:
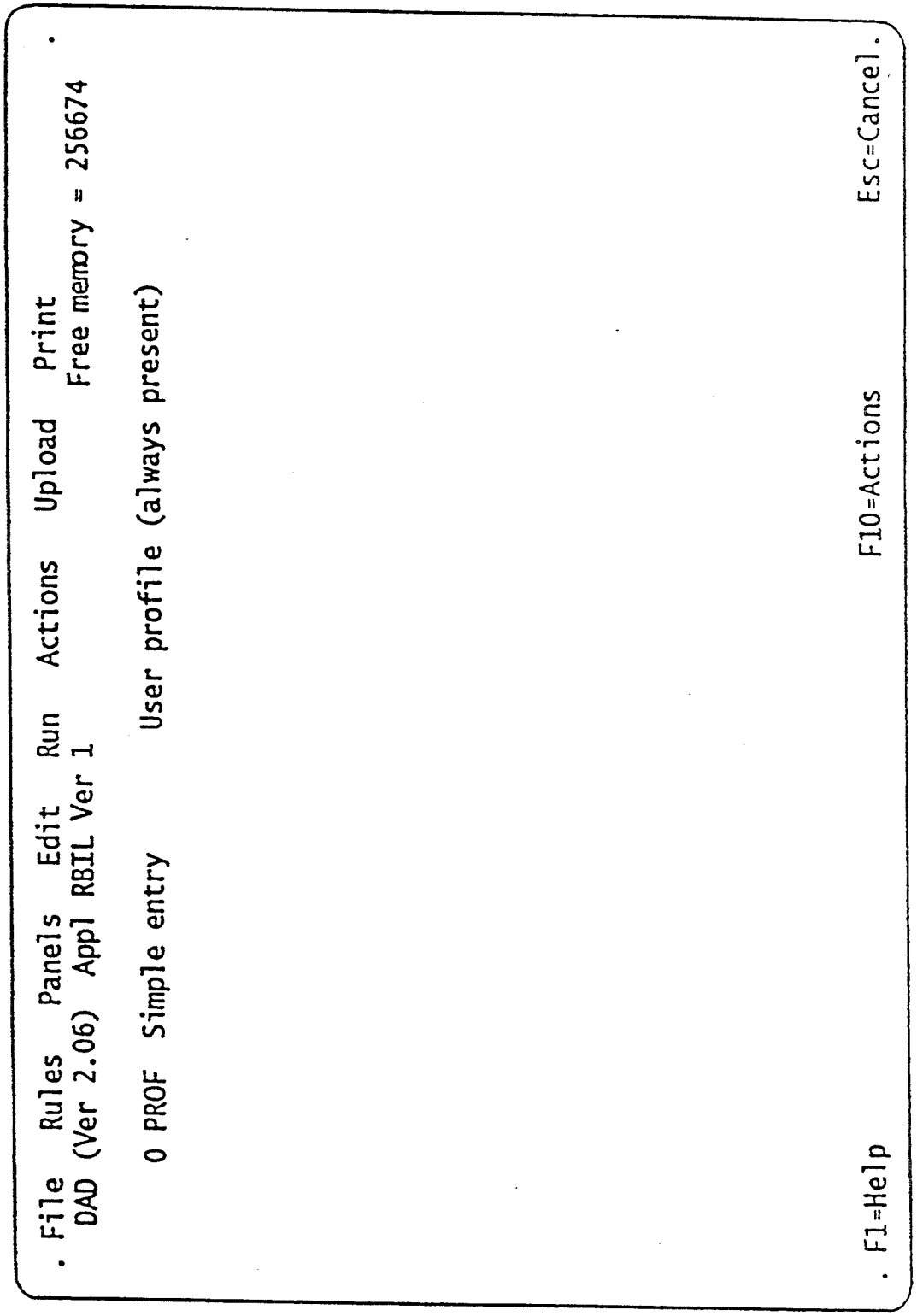
FIG. 3 shows an example of a panel list screen displayed to a form designer using the system of FIG. 2.

The operation of the Panel Designer is as follows:

The first screen shown when the Designer is run (step 201, FIG. 20) is the main menu (or panel list screen) which is a list of all the panels defined for the application. An example is shown in FIG. 3, having just a single panel, called PROF, in the list. The four columns on screen are the panel number ("0" in this example), a four letter panel name ("PROF"), a panel type ("Simple entry") and a short description of the panel ("User profile"). Further panels may then be entered as required and numbered sequentially down the screen (step 202, FIG. 20).

The order in which the panels are listed is important in determining the sequence in which panels are displayed. Panels are selected by moving the cursor up and down, then the required action can be chosen using the function keys shown.

Pressing the F10 key activates the action bar at the top of the screen to permit selection of one of the illustrated actions. These actions: File, Rules, Panels, Edit, Run, Actions, Upload and Print will be described as necessary as the operational description progresses. Actions are selected by tabbing a highlighting block along the Action bar and operating the "enter" key.

For the creation of a new application, the "Panels" action must be selected to provide two options in a pull-down window:

1. Add new panel
2. Delete a panel

In adding a new panel (step 206, FIG. 20), the user is prompted to name the panel using four letters. The panel type and a panel description are then asked for. These are input using the Enter key and the new panel is placed (step 207, FIG. 20) after the currently highlighted panel in the panel list of FIG. 3.

The panel types supported are summarized in the following table:

| Panel type | Description |
|---|---|
| Information | displays protected data such as messages, help, tables, summaries. |
| Single-choice | displays list of choices from which user selects one choice. |
| Multi-choice | displays list of choices from which user selects zero or more choices. |
| List | displays list of items from which user selects a single item. |
| Simple entry | normal data input panel. |
| Multi-line entry | allows entry and editing of multiple input lines |
| FileDef | generates a text file (which may be printed). |

Two panels must always be present for an application to work. The first is the "Profile" panel, and the second is the Start panel.

The "Profile" panel is a default panel of type "Simple entry". It is used for storing general information about the user entered on the first run of the application. The next compulsory panel is the start panel. This is numbered as the first (or only) panel and is displayed when the application is run. It may be any one of the above types.

Having created a list of panels, the next step is to design the panel screen content as it will be seen by the end-user. To enter the panel screen editor, the cursor is positioned on the required panel and the Enter key pressed (step 208, FIG. 20). This displays the screen (step 208) that the end-user will see which is shown in FIG. 4. The function keys available to an end-user are automatically inserted in the panel according to the panel type (and CUA TM requirements). These are visible one line up from the bottom. The panel name ("MAIN") is displayed in the top right hand corner, and below that is the row and column position of the cursor. Two horizontal lines are visible to the end-user and separate the main screen from the action bar at the top, and the function key definitions at the bottom.

Two things that the eventual user will not see are the Designer function key definitions, shown at the bottom, and the cursor position display, in the top right corner. The Designer function key definitions are valid only while in the panel screen editor.

For most panel types, the central main screen will be blank at first as shown, but for multi-line panels, there is a line marking the division between top and bottom halves of the panel.

The principal commands available from the panel screen editor are:

| | |
|---|---|
| F1 | The help key calls up a help screen. The panel screen editor help screen shows a list of available controls together with a brief description of their function. |
| F3 | When the exit key is pressed, the panel list screen (FIG. 3) is returned to. Any changes made in the panel from which the exit is made are kept. This corresponds to step 212 in FIG. 20. |
| F4 | Define Normal Constant (step 210, FIG. 20). This allows unhighlighted (cyan) text to be placed on the screen. The constant required has to be typed into the box that is presented on the screen. When entered, the text is positioned on screen starting from the current cursor position. |
| F5 | Define Highlighted Constant (step 210, FIG. 20). This is the same as F4, but the text is displayed in bright yellow (or other distinctive color). |
| F6 | Define/Edit Variable (step 211, FIG. 20). If the cursor is not positioned on a variable field, then a menu appears listing all the variable names that have been defined for the current panel. One of these can be chosen by highlighting it and pressing enter and a window appears into which the variable can be entered. |
| F8 | If the cursor is positioned on a constant field, and this key is pressed, the text of the constant may be altered. |
| F10 | This deletes any variable or constant field on which the cursor is currently positioned. |
| Esc | This quits the panel screen editor and returns to the main panel list screen. Any completed changes made in the panel are kept. |

Other functions are available from shifted and other keys but are not necessary to an understanding of the present invention except where specifically described below.

Figure 20:
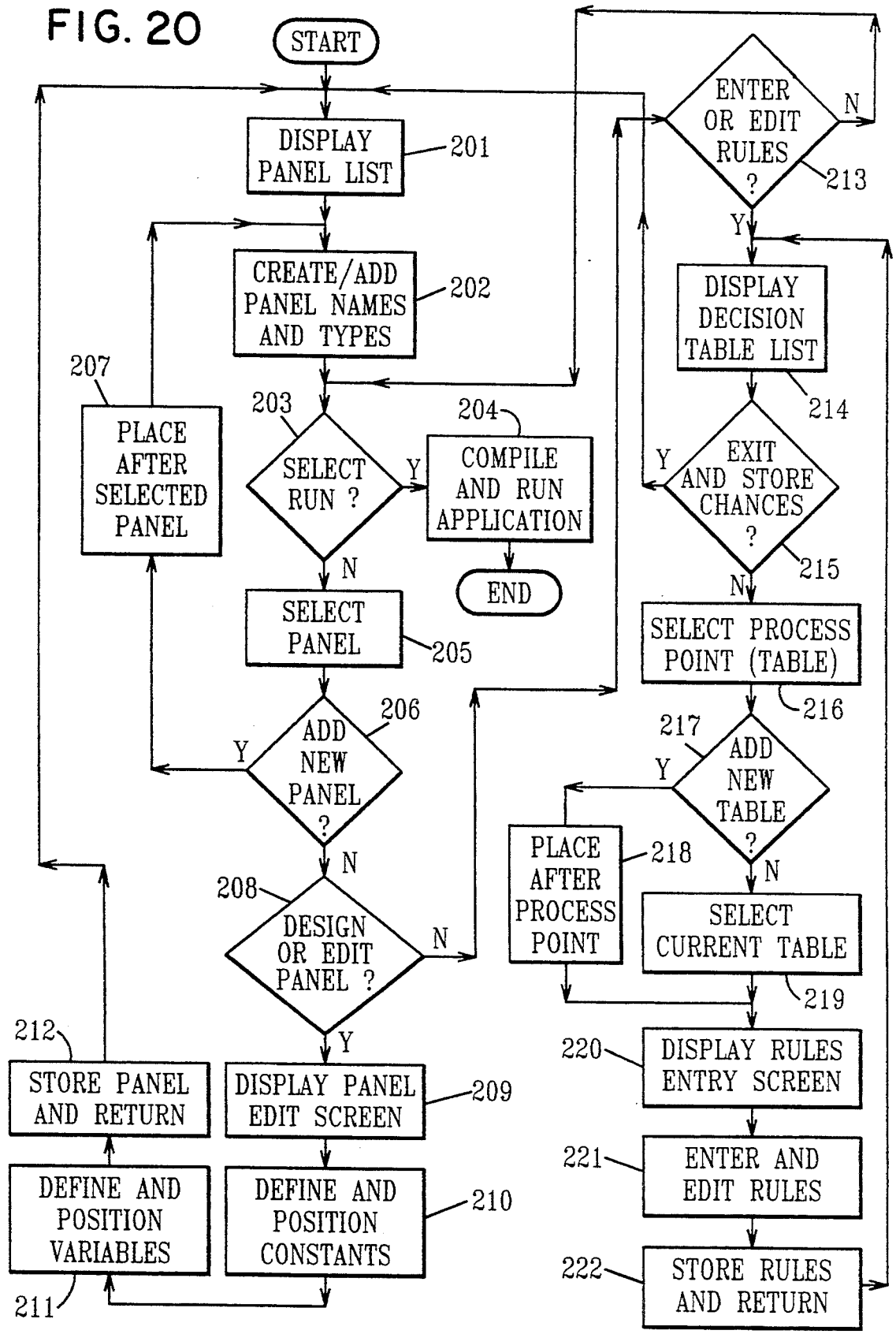
FIG. 20 is a flow diagram illustrating a method of generating a rules-based end-user interactive application program according to the invention.

In order to obtain text on a panel screen, a constant field must be defined (step 210, FIG. 20). There are two keys for doing this, which give different appearances in the final text. The first option is the F4 key for Define Normal Constant, which places unhighlighted (cyan) text on the screen. This is done by placing the cursor where the text is to go, pressing F4 and typing the text into the box provided on screen. The maximum number of characters that can go in one constant field is forty, so if more characters are needed, another constant field must be declared.

Using F5 for Define Highlighted Constant allows highlighted text to be placed on screen using exactly the same procedure as in defining a normal constant (step 210, FIG. 20). The text shown on screen is bright yellow. An example of a screen having constant data entered for the panel call MAIN is shown in FIG. 5. The sample application is the creation of an electronic form for ordering manuals from a technical library.

In order to obtain information from the end-user, a variable field must be defined (step 210, FIG. 20). This is usually in response to a question expressed in an adjacent constant field or to a prompt. The list of variable names is defined for the panel by using Alt-V keys. All variable names must be declared before they can be used on the screen or in the rules. Variable names must start with a letter and can be up to 16 characters long. More than one variable name can be typed into the box which appears as a result of Alt-V and this is achieved by leaving a space between the different names.

Once the variable names to be used have been declared, variable fields can be placed on the panel of FIG. 5 at the cursor position by pressing F6 to Define/Edit Variable. A menu of the variable names that have been defined appears, and one of these should be chosen by highlighting and pressing Enter. A window is produced, into which the variable attributes can be entered. An example of such a window superimposed on the screen of FIG. 5 is shown in FIG. 6 for a variable named "MANNUM".

At the top of the window is the name of the variable. The row and column entries simply reflect the position of the variable as defined by the cursor.

The top row of attributes has the following meanings:

| | |
|---|---|
| "Optional" | Specifies an input field that may be left blank; |
| "Mandatory" | Specifies an input field that may not be left blank; |
| "Protected" | Specifies an output field. The value of the variable will be displayed in the field and the user cannot |

-continued alter this value.

The second row of attributes: rate, Alpha, Mixed, Numeric, Integer Currency, determines the permitted types and formats of input characters.

As illustrated, the third row of attributes applies to signed and unsigned numbers whereas the fourth row applies to text variables. However, the contents of the third and fourth rows change upon selection of different attributes in the rows above. For example, if "Date" is selected, the third row contains the options "past-/future/both".

Setting the 'Autoskip' value to "Yes" causes the cursor to find the next input field automatically after the last character of a field has been entered. The 'Initial Status' variable can be Active (default) or Inactive. When active, it means that the variable is visible on the panel and can be used straight away. When Inactive, it is not shown on the panel, and is only called for use when required.

Setting the 'Force M/L' option to "Yes" forces a variable defined in the top section of a multi-line panel to be multi-line if it would not be so defined by its context and use.

The 'Initialize' facility enables the current variable to be initialized to the value held by a variable on another panel. In this space, the other variable is referenced by "panl.varname", "panl" is the name of the other panel, "varname" is the name of the variable on this other panel.

When an end-user makes an invalid entry, the user is warned and prompted to re-enter. The user is not allowed to leave the panel until the data is correctly entered, except by pressing cancel or by selecting an action that calls another screen. The called screen will return to the point from which it was called.

At the end of the design process, the MAIN panel of the Manual Order application will appear as in FIG. 7, the end-user being required to enter details in the underscored fields. At this point, the panel can be stored (step 212, FIG. 20) by pressing the exit key F3.

Multi-line panels have several special features that are not present in other panel types. An example of a multi-line panel is shown in FIG. 8.

Multi-line panels are split into two parts. The top half contains the questions and the input fields. The bottom half, known as the scrolling zone, contains a table of all the previous information entered, each line corresponding to a one complete set of answers from the top half. The dividing line between top and bottom is movable. The top part is similar to a simple entry panel. Multi-line panels are also edited and variables are defined by operating appropriate function keys on the lowest row of the panel editor screen in the same way as for other panels.

When the cursor is in the scrolling zone, selection of the Defvar (F6) option causes a window as shown in FIG. 9 to be displayed. This allows only the length of the field and the alignment to be adjusted. When enter is pressed, a whole column of fields is created, showing where that column of information in the table will go.

When an end-user enters some data in the top half (FIG. 8), and presses enter, the data entered in the multi-line input fields appears in a new line in the bottom half. The input fields are then reset to hold nulls again.

Rule Base and Decision Tables

Following the completion of the panel design process, the next step for the application developer is to generate the rule base by creating decision tables. From the main panel list screen (FIG. 3), a panel for which rules are to be produced is highlighted and the "Rules" option is selected from the Actions bar (step 213, FIG. 20). The only option available is "Edit decision table" which accesses the decision table editor portion of the Designer program. The first screen to be displayed (step 214, FIG. 20) is the decision table list as shown in FIG. 10.

The box in the middle of the screen lists the decision tables for the panel of interest. Numbers 1 to 4 represent process points to which the decision tables correspond, namely:

1. Initialization
2. Line of data entered
3. Line of data accepted (no errors) and stored
4. Panel exit and any of these may be undefined.

Decision tables are selected by movement of the cursor and by pressing Enter (steps 216 or 219, FIG. 20). If more space is required within a process point, then another table can be created (step 217, FIG. 20). This new table is appended to the list, and can be called using a rule within the current process point.

The keys available on the decision table list screen include the exit key F3. Pressing this causes the program to return to the screen from which the table list screen was called (step 215, FIG. 20). Any additions or alterations made are preserved. The F10 key is used to access the Actions bar along the top of the screen. The actions available are as follows:

| | |
|---|---|
| "Create" | allows a new table to be defined for the currently selected process point (step 217, FIG. 20). The new table is placed after any others already defined for the point (step 218, FIG. 20); |
| "Copy" | copies one table onto another; |
| "Delete" | deletes the panel that is currently highlighted. |

In order to describe decision table design further, it is desirable to define what a rule is. Basically, a rule consists of three parts; Conditions, Actions and Logic. The Actions attached to a rule are carried out only if the Conditions match the Logic. The general form of a condition is:

Expression—Relative Operator—Expression

An expression is anything that has a value. For instance any variable name is an expression. Expressions can also consist of direct data where the value is entered directly in the expression. Expressions can be joined together with normal arithmetic operators or, if textual, can be concatenated.

Expressions can include a variable outside the current panel, by prefixing the variable name with the name of the panel it comes from. Expressions can also include read-only system variables.

There is one further type of expression, using functions. A function is an operation that can be carried out on any variable. The general form of a function is "funcname(parameters)"

Every expression has a value, either a numerical one, or a textual one and each condition is just a comparison between the values of the two expressions. The relative operator defines a possible result of the comparison and so any condition has two possible outcomes; TRUE or FALSE. Conventional equality and inequality relative operators are recognized by the system in defining the rules.

In FIG. 11, commands are placed in the lower left or action quadrant of the decision table. The conditions described above provide tests on information that can be used to decide whether actions are carried out. The format for a command is "command_name parameters" or else the command may be a assignment statement having the format "varname=expression", that is, the value of the variable on the left is set to the value of the expression on the right.

The final part of a rule is the logic. Having used conditions to perform tests on data and actions to processor route items (deciding which panel to show next) and check errors, the table logic combines the two to produce rules.

The idea of decision table logic is quite simple. Every rule can have a number of actions associated with it. These actions are either all carried out or not carried out at all. The actions are only carried out if the conditions match the logic.

This last point needs more explanation. Every rule has a number of conditions associated with it. As detailed before, each of these conditions is evaluated as either true or false. For each condition, a necessary outcome is specified in the logic, either true or false. Only if the actual outcomes of each of the conditions are the same as those specified, will the actions be carried out.

For instance, as shown in FIG. 12, suppose a rule had the following conditions and necessary outcomes:

| UNLIMITED_BUDGET? = "y" | N |
| EXPENSE > LIMIT | Y |

The text on the left is the conditions. The letters to the right are the necessary outcomes. A 'Y' means true, a 'N' means false.

Suppose the actions associated with the rule were:

| EXCESS = EXPENSE − LIMIT | X |
| flag EXPENSE | X |

These actions are only carried out if the conditions match the logic, i.e., if the variable UN-LIMITED_BUDGET? does not hold "y" AND the value of EXPENSE is greater than the value of LIMIT. If both these statements hold, then the actions are carried out. The value of EXCESS is set to the difference between EXPENSE and LIMIT, and the value of EXPENSE is flagged in the printout. If either or both of these statements are untrue then neither of the actions are carried out.

Returning now to the description of the operation, the decision table editor is accessed from the decision table list screen of FIG. 10 by highlighting a table name and pressing enter (steps 216 or 219, FIG. 20). As shown in FIG. 11, at the top of the editor is the name of the table ("Example"). At the bottom of the screen is a list of available function keys. Most of the rest of the screen is divided into quadrants for displaying conditions and condition selections in the top two quadrants and commands and command selections in the bottom two quadrants as described above. This corresponds to step 220 in FIG. 20.

Editing the table (step 221, FIG. 20) permits normal insertion and deletion of data and cursor movement.

The use of Alt-V keys allows the definition of new variable names from within the decision table editor, as in the panel editor.

The F5 key allows the divisions between the boxes to be moved around using cursor keys. Anything in the boxes automatically adjusts to the new position.

The F10 key enables the actions listed in the Action bar, which are:
the "File" action which has two options:
1. Save data and exit, as shown in step 222, FIG. 20. (Returns to the decision table list screen (FIG. 10), and any changes made are kept);
2. Quit without saving (Returns to the decision table list screen, and any changes made are lost);
The "Edit" action has four options:
1. Insert row.
2. Insert column.
3. Delete row.
4. Delete column.
The "Variables" action has two options:
1. Display variable names.
2. Define new variables.
The "Check" action compiles the table, thus checking syntax, variable names etc.
The "Title" action renames the table.

The result of using the decision table editor to create a table (step 221, FIG. 20) including the simple rules specified in the above example is shown in FIG. 12.

The table may be modified to make the rule slightly more complex as shown in FIG. 13.

Note that the order of the two rules here has been interchanged since the system evaluates rules from left to right and it is good general philosophy to evaluate error checks first. As well as processing rules from left to right, the system also works from top to bottom within a rule. This means that if a new value is assigned to a variable, that variable will take the new value if referred to by actions further down the same rule. The outcomes of all the conditions are re-evaluated for each rule, so it is possible for an earlier (further to the left) rule to alter variables that are used in the conditions for a later rule, and so affect how the rule is executed.

The above examples are very simple ones and it is important to realize that the system has a great many built in Decision Table Commands and built in Functions that can be used by the application developer. One of the most important of these is the SHOW command which has the form:
SHOW panelname [modifier]
where modifier is 'I' or 'X'.

This command schedules the named panel to be shown when DAD next searches for a panel to display by setting a "show" flag. When a panel terminates, the panels are checked in order and the first panel found with its 'show flag' set is made the current panel. If the 'X' modifier is present, the 'show flags' of all other panels are turned off—this is the only way of ensuring that a certain panel is displayed after the current panel. If the 'I' modifier is specified, then the panel "panelname" is displayed at the earliest opportunity (lower priority than error handling, help action etc.) and control returns to the current panel when panelname terminates.

Another important command is the TABLE command, having the format TABLE tablename. This is the command by which one decision table can call another.

Another commonly used command is the ERROR command which has the form:

ERROR varname expression

This causes an error window to be displayed around the variable identified by varname. It halts decision table processing for the active exit point.

The EXIT command has no parameters and indicates that the application is to terminate. No further processing is done for the current decision table, and no more tables are called.

Built in functions include many common mathematical functions such as log, exponential and square root functions and also text related functions such as WORDFIND (varname, phrase) which returns '1' (true) if the variable "varname" contains the string "phrase". The MATCH (data, pattern) function returns '1' (true) if the data entered by the end user matches a specified pattern.

It should be realized that the system has predefined System Variables which can also be referenced, though usually not altered, by decision tables. For example, the system variable CSRROW indicates the row the cursor was on when the user pressed Enter of F10. LINENUM is the number of the current input line on a multi-line panel.

Finally, decision tables can reference Lookup Tables stored in files 33 (FIG. 2) to access prerequisite data, e.g., currency exchange rates, for a given application. The lookup function offers a variety of ways of verifying or translating data.

Output File Generation

In a typical application development sequence, output files are created for printing or onward transmission. They are formatted, summarized etc under control of the FileDef editor of the designer program, which is chosen from the panel type options presented while designing the Panel List screen.

Special File Definition Commands are available for listing and sorting data, defining page length, headers and footers etc. The control of the output file creation is handled by associated decision tables. Output files are flat (2-dimensional) files which can have as many lines as required, each line being limited to 255 characters.

Compiling and Testing the Application

Applications can be compiled and tested by selecting the "Run" action from the action bar on the panel list screen (step 203, FIG. 20). This presents three options: "Whole application", "Single Panel" or "Compile Only". Selection of either of the first two options also causes the panel or whole application, as appropriate, to be executed using the workstation Interpreter Program (step 204, FIG. 20).

If errors occur the system provides two debugging options. The first is called tracing and produces a record of all the commands carried out in response to the various conditions, either TRUE or FALSE. For commands, both the text of the command and, if relevant, the value assigned to a variable, are shown.

The second option is a spot check while the program is running. On pressing the appropriate keys a list of all the panels is shown. For each panel the following information is given.

Panel name
Whether show flag is set
Panel type
Number of variable names defined for that panel The current panel is highlighted, but the highlighting can be moved up or down. If a panel is highlighted and enter is pressed, further information about the variables on that panel is shown such as their type, current value, attributes and location.

When the application has been tested and edited to the developer's satisfaction, it is recompiled by selecting the "Run" action. The application files DEF and STR may then be transferred to other platforms (eg., mainframe system) by selecting the "Upload" action from the Panel List Screen.

Software Implementation

Having described the overall structure of the system with reference to FIGS. 2 and 20 and the development of an application with reference to FIGS. 3–10, some further explanation of the software implementation of the DAD system will now be given.

As has been described above, a typical application consists of several panels and their associated decision table. The panels are listed on a panel list screen like that of FIG. 3. In stored files 28 (FIG. 2) is a corresponding panel table of the following form:

| Name 1 | Type | Description | Pointers |
|--------|------|-------------|----------|
| Name 2 | Type | Description | Pointers |
| Name 3 | Type | Description | Pointers |
| Name 4 | Type | Description | Pointers |
| etc    | etc  | etc         | etc      |

Name, Type and Description have the same meanings as on the visible screen. The pointers are a list of addresses that point to linked lists containing definitions of constants, variables, control data and decision tables. These lists are also part of files 28.

A typical list entry for a constant definition is of the form:

| Next | Row | Colomn | Pad | Highlight | Data |
|------|-----|--------|-----|-----------|------|

The Row and Column attributes define the physical placement of the constant on the screen, the Pad entry defines the use of padding characters and the Highlight entry defines whether the constant is to be in highlighted mode. The Data field contains the actual constant value. The Next field is a pointer to the next constant definitions in the list. Similar definitions are created for variables and control data.

As the user creates and modifies panels and tables on screen, the corresponding stored tables and lists are updated accordingly. Files 28 include files DD1 of panel related data and files DD2 of decision table related data.

As previously explained, the compiler 22 then compiles files 28, checking that all data is valid and consistent, before producing the DEF (control information) and STR (constant data) application files 29. Additionally, the compiler produces a MAP file listing the order in which the panels were compiled. The control information in the DEF file is in tokenized form (also known as pseudo-code) to permit execution by different platforms (mainframe or workstation) by the Interpreter 11.

The interpreter 11 interprets the two source files DEF and STR to provide a run-time program. It operates by initially loading the STR application files 29 into an array of strings and the DEF files into a linked list of blocks of control information. A panel table is constructed, from this data having the following form:

| Name | Type | Show | States | Control | Variable table |
|------|------|------|--------|---------|----------------|
| Name | Type | Show | States | Control | Variable table |
| Name | Type | Show | States | Control | Variable table |

The show flag indicates that the panel is to be displayed. The control field would include such information as the length of the panel's variable table and counters. The Variable Table entry is in fact a pointer to the variable table for that panel which has the following form:

| Name | Length | Type | Status | Count | Value |
|------|--------|------|--------|-------|-------|
| Name | Length | Type | Status | Count | Value |
| Name | Length | Type | Status | Count | Value |

The Name and Length fields simply contain the name and length of the variable. The status field may reflect conditions of the variable such as "in error" or "undefined". The Count field is set to one for a simple variable and to the appropriate value for multi line variables. The Value field is a further pointer either to a simple value block for a simple variable or to a linked list of such blocks for a multi value variable used with a multi-line panel.

A panel scheduler scans the panel table until a panel is found with an active show flag or until table end is encountered. The show flag may have been set by the designer according to the decision table logic. If not the default panel is panel No. 1.

If a panel is found, the appropriate routine for that type of panel is called. This builds the display screen and controls execution. If no panel is found, then the interpreter terminates.

Figure 14:
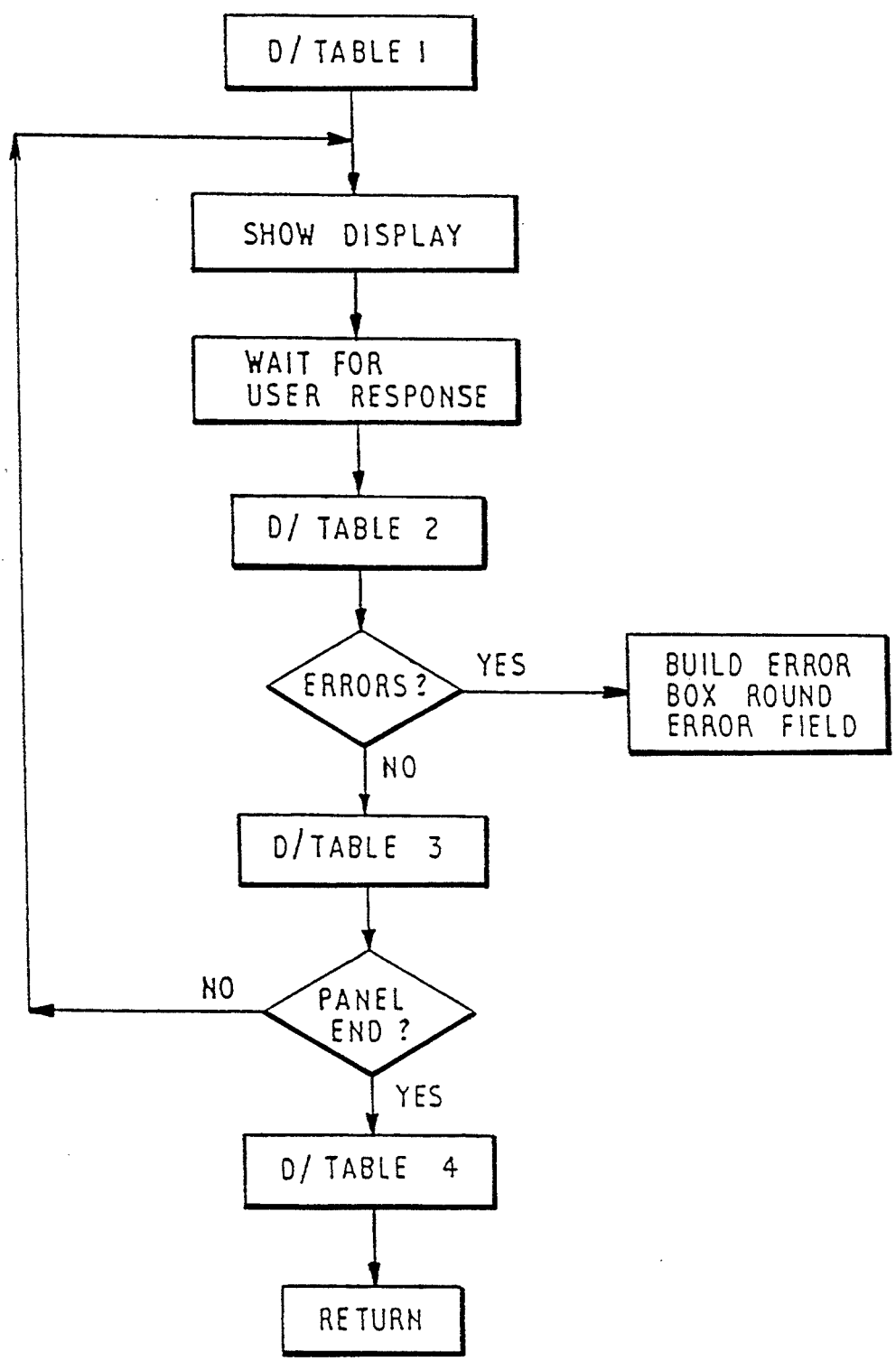
FIG. 14 is a flow diagram illustrating the processing of a basic panel at run-time.

The routine for basic panel processing is shown in FIG. 14 in which it can be seen how the execution progresses through the four types of decision tables associated with respective panel/process points, as follows:

| 1. | Entry point | Rules at this process point are evaluated according to decision table 70 whenever the panel is to be shown to the end user, but before anything is actually printed on screen as at step 71, e.g., output variables on the panel can be assigned values in the entry point decision table, which they will have on the screen. Default values for input fields can also be set. |
|---|---|---|
| 2. | Data entered | On any panel, processing of user input is normally carried out only after the end user signals at step 72 that they have read everything on the screen and filled in all necessary fields by pressing an enter or function key. Processing can also occur if actions have been defined that enable the user to exit the panel, and the response has been defined in the rules. When the system receives such a signal, it begins execution of the rules for the current panel, according to decision table 73. |
| 3. | Data accepted | Decision table 76 is called straight after the one above if no errors were found at step 74 and is primarily for processing the data checked at process print 2. This table or tables are used to save data and for instructing the system to show other panels. If an error was found, a box is built around the erroneous field at step 75. |
| 4. | Panel exit | When the end user actually leaves the panel at step 77, the rules decision table(s) such as table 78 for this point are called. |

These tables are used to save data and for instructing the system to show other panels.

2. Ingelligent Data-Stream Processor (IDSP)

This is a second embodiment of the invention in a totally different application. Specifically, IDSP relates to the validation of data transactions, and the simulation of appropriate response transactions, between computers connected together via a network.

The management of a data stream in a digital communications network, such as a LAN or WAN, presents many problems, particularly with the detection and elimination of invalid and illegal data transactions. Such transactions, if not detected at source, can quickly clog up a network, and lead to reduced operating efficiency. One solution is for a special program to be written that tests for the validity of all the transactions prior to sending via a network. The program would have additional utility if it could also simulate the corresponding response transactions that would normally be expected.

IDSP provides a way to quickly and easily generate an application program that can be used to verify and simulate typical data transactions within any given network. The system allows the various data stream structures to be explicitly defined in a data dictionary, and the process logic to be expressed through easy-to-understand decision tables to generate an application program conforming to a desired network protocol.

IDSP includes a computer program which enables a non-programmer to build and test a 'filter' for a given set of data records. A 'filter' is a program which reads an input stream, and performs one or more actions based on the contents (and possibly the context) of each record in that stream.

The actions taken could include:
discard the record
modify the record
replace with a record from another input stream
write the record to the one or more output streams
total the contents of a field Using IDSP the user can define the formats of input records, specify the processing to take place on the records (using simple decision tables), then interactively test and modify the application until the desired results are obtained. Extended function is obtained by calling external programs.

The primary input stream can be from a disk file or an asynchronous communications line, and the output stream(s) can be directed to another disk file, a printer, a display screen or an asynchronous communications line.

There are many possibilities as to the type of application which can be produced using IDSP, from simple one-off file 'fix-up' programs to large and complex on-line transaction processing systems.

Figure 15:
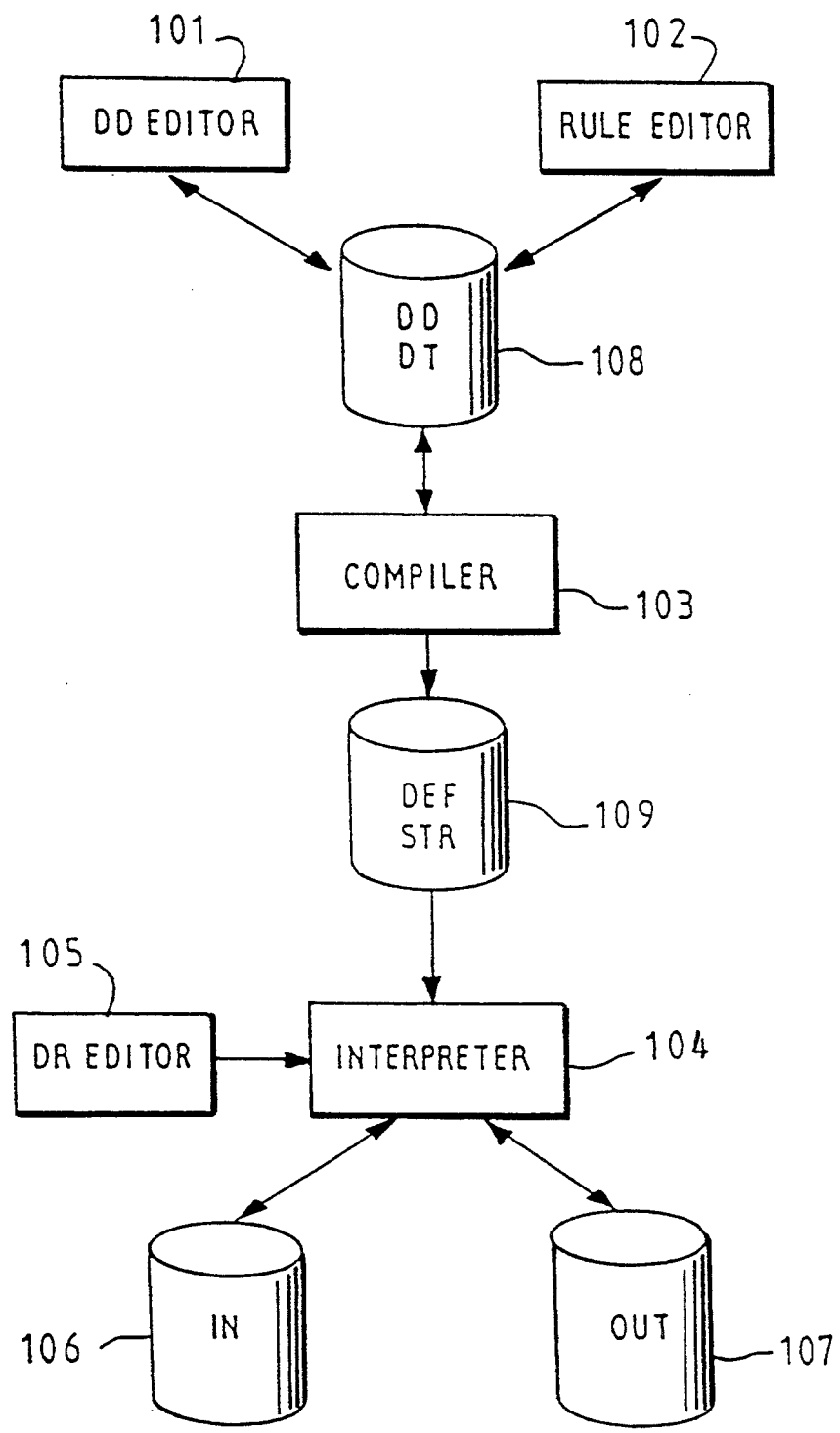
FIG. 15 is a schematic illustration of an intelligent data stream processing system (IDSP) including a data processing system according to the invention.

A schematic overview of the IDSP system is shown in FIG. 15.

There are essentially five main components of IDSP, a data dictionary (DD) editor 101, a rule editor 102, a compiler 103, an interpreter 104, and a data record (DR) editor 105. User interaction with the editors 101, 102 and 105 is by way of a workstation 110 having a display, input device and data store.

The DD Editor 101 provides a method of creating and amending a data dictionary defining the formats of all transactions that IDSP can legally send or receive.

Data can be defined as a set of values, e.g., starting column, length of field, name, attributes (mandatory, optional etc.). Transactions that do not correspond to the data dictionary definitions can be optionally ignored or rejected, depending upon the decision table rules.

In the rule editor 102, the main processing rules are defined in a decision table format exactly as in the previously described DAD example. At various points during processing the shell calls user processing routines. These routines take the form of decision tables. As with the previous example, a special editor is provided to facilitate creation and modification of decision tables.

The compiler 103 takes the data dictionary definitions, and the decision table rules, and compiles pseudocode from them. This p-code is a precise statement of the functionally of the proposed application.

As in the DAD system, the compiler 103 processes the decision tables sequentially, changing each table into a number of "IF condition(s) THEN action(s)" statements known as production rules. The output of the compiler is a pair of files 109 named DEF and STR which contain all the information necessary for execution.

As in the previous example, the interpreter 104 will use the pseudo-code to provide a working, functional application program. Transactions will be read into an input buffer, processed according to the logical rules, and the corresponding output transaction/s generated and stored (107).

The data record editor 105 permits the setting of any particular values in the input/output transactions at run-time. This would have particular applicability, for example, in systems testing situations. It is employed in the development of an IDSP application by the designer to the extent that it is used to set initial control values.

The basic building block of an IDSP application is the 'group'—a collection of objects which belongs to a particular format of input record. In many ways, groups are analogous to panels in the DAD system.

The components of a group are: a data dictionary (DD) which defines the format of the particular record, a data buffer which holds the current data record (DR) for the group and a set of decision tables (DT) to define the processing required.

An application is made up of two or more groups, the first of which is called the control group and the second is called the input group. All groups except the first are also called record groups. (Group names can be from 1 to 8 characters and the control group gives its name to the application).

There are at least four decision tables for each group which are called at different process points (even if they are empty). The following table illustrates the process points for the different types of group.

| Table | Control group | Input group | Other groups |
|---|---|---|---|
| 1. | Called when the group is loaded or reloaded | Called whenever an input record is read | When called by another group (CallGroup) |
| 2. | Data record changed by the data record editor | Data record changed by the data record editor | Data record changed by the data record editor |
| 3. | When saved to disk (File or Save action) | At end-of-file on input stream | Reserved |
| 4. | Reserved | Reserved | Reserved |
| 5+ | by "CallGroup" | by "CallGroup" | by "CallGroup" |

When the IDSP generated application is loaded by the end-user the application object files are read into storage from disk, and the rules for the control group are run.

When the end-user selects the "Process" action (from the action bar on the main menu) the input stream 106 is opened, the first record is read into the data buffer for group 2 (the "input" group) and the first rule table for the group is processed. All subsequent processing is under control of the user-defined rules, and would typically include checking of input data, totalling, creation and writing of an output record into the output stream 107.

This sequence is repeated for all records in the input stream; when all processing has completed the input and output streams are closed and control returns to the user at the main menu.

Figure 16:
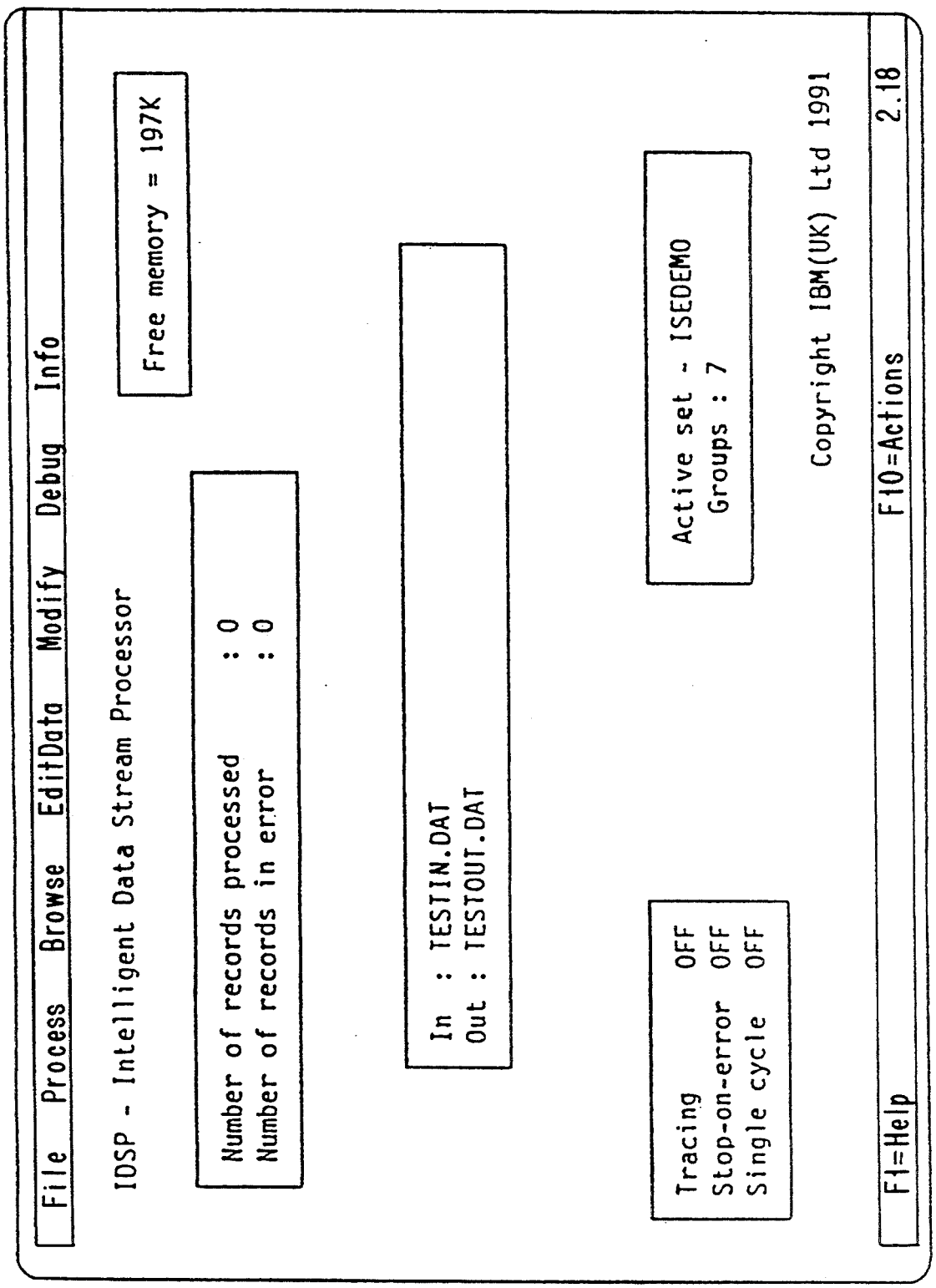
FIG. 16 shows a main menu display screen, displayed to a user of the system of FIG. 15.

When the IDSP system is started the main menu such as that shown in the example of FIG. 16 is displayed. The center section of the main menu contains control and status information about the input and output stream and the testing options. All IDSP functions are accessible from this screen, either via Function keys (which are displayed on the bottom line) or by invoking the Action Bar (top line of the screen) with Function Key 10. This screen is a common screen for both the application developer and end-user (who in this case might well be one and the same).

From the Action Bar various actions are available:

| | |
|---|---|
| File | Save the application definitions, specify input and output files, or exit IDSP (with or without saving data); |
| Process | start the processing of the input data stream, or call a specified group a specified number of times; |
| Browse | with this option the contents of a log file (including trace date), input and output disk files and the compiler map can be examined; |
| EditData | allows modification of the input data set or of the contents of the record buffer (DR) for any loaded group; |
| Modify | is the action which permits access to the application build facilities (edit data dictionaries and decision tables, compile application and reload application); |
| Debug | set and reset switches controlling tracing, stop-on-error and single-cycle; |
| Info | display application status and produce a file containing application definitions which is suitable for printing; |

Figure 17:
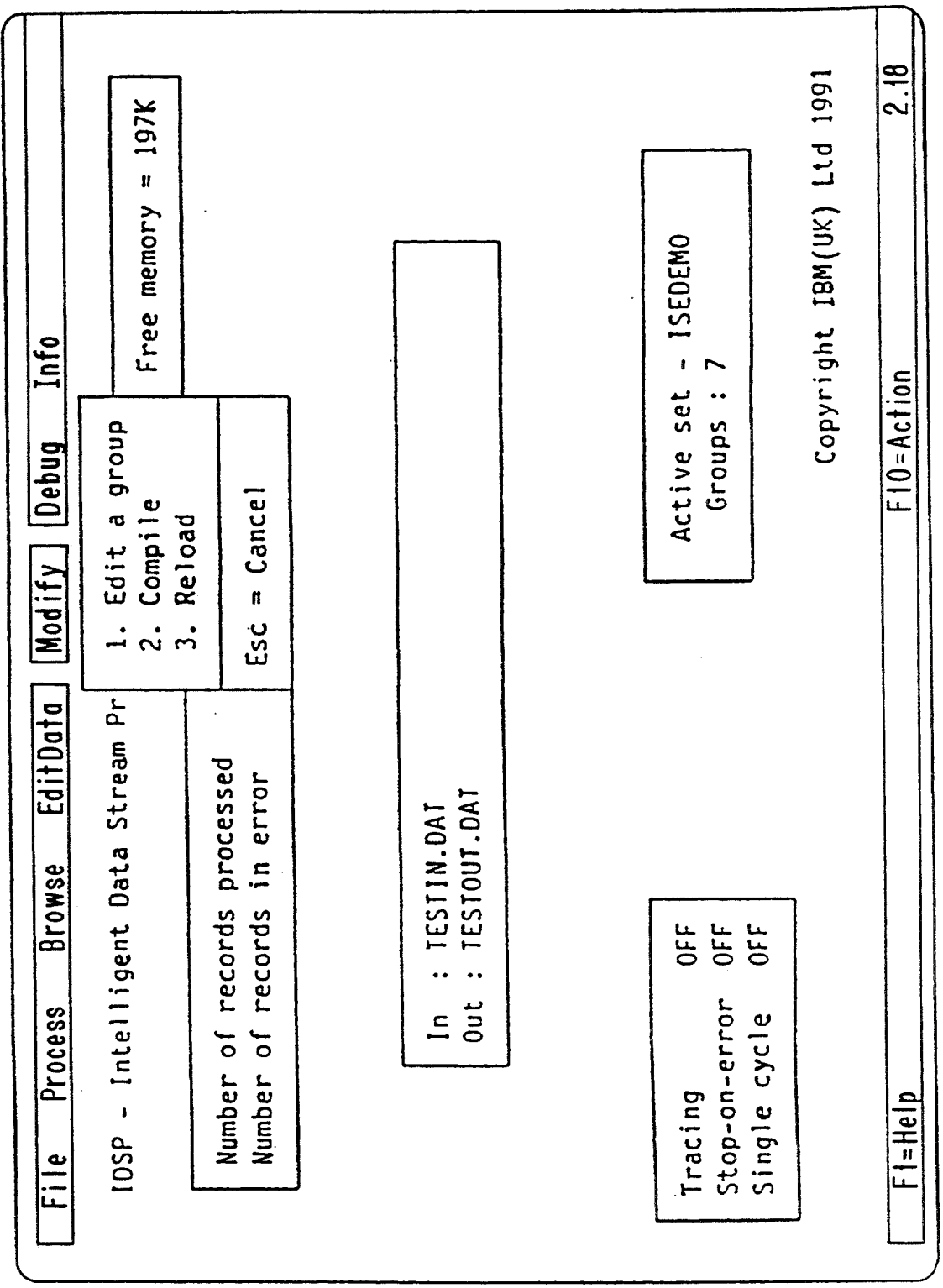
FIG. 17 shows the display screen of FIG. 16 with the modify action selected.

The normal development sequence is to use the 'modify' functions to create the data dictionaries and decision tables, compile and reload the application, then test and check for correct operations using the various debugging facilities. This causes a screen such as that shown in FIG. 17 to be displayed which shows a pulldown window offering the options of calling the data dictionary and decision table editors ("Edit") or compiling or reloading the application. First the data dictionary editor is selected.

The focal point of the group is the data record, which is a fixed-format element of a file (or data set), and the other group components describe the content of the record ('fields') and the actions to be performed on those fields (specified by means of decision tables). The data dictionary editor accesses the tables which define the content and format of the corresponding data record (name of the field, its starting position and length, and the type of data it contains). The data dictionary definitions are stored on disk (group_name.DD) in files 108 of FIG. 15.

An example of the data dictionary screen is shown in FIG. 18. The data is displayed in five columns:
field number,
starting column,
field name (used to refer to the field in decision tables),
length of field
attributes—string of characters describing the type of data in the field. They can be in any order, and are:
O—for optional;
M—for mandatory;
C—field contains character data;
D—field contains date in YYYYMMDD format;
P—field contains an integer in the range 0 to 100;
N—field contains a number (ie., digits 0–9 and an optional decimal point). May be followed by "m.n" where m is the number of characters before the required decimal point, and n is the number of characters after the point;
I—field contains integer data (ie., digits 0–9);
S—numeric or integer qualifier indicating a + or − sign is required;
U—numeric or integer qualifier indicating a + or − sign is not permitted.

Creation and use of decision tables in the IDSP system is very similar to that in the DAD system, except that some of the built in commands and functions are different.

When the data dictionaries and decision tables have been fully defined, they are stored and compiled for execution as outlined above. Extensive test and trace facilities are provided as part of the application is to provide a simulation of a real network filter for testing application programs designed to run on the network. In this event, the end user is probably also the developer but the decision table interface provided by IDSP remains a convenient way of allowing the developer to describe the characteristics of the filter in terms of expert knowledge. For example, the application could be to the processing of financial transactions in a bank or stock exchange.

The Data Record Editor 105 is used to set the contents of the buffer for a particular record group. This is primarily of use when IDSP is to be run and various data records must be initialized. It may also be used in the design phase to set the value of control variables in the control group. It is called by the user by selecting the "Edit Data" action from the screen of FIG. 16.

An example of the resulting Data Record Editor display screen is shown in FIG. 19. Each of the variable fields of the record defined on the screen of FIG. 18 is set to an explicit value as shown. The Data Record Editor allows the contents of the record currently in the buffer to be inspected or modified at any time.

The key actions are:

| | |
|---|---|
| Esc | exit and discard changes |
| F1 | Help |
| F3 | save changes and exit |
| F6 | write the contents of the record buffer to the output file |
| F9 | display the attributes for the current field |
| Up | move cursor up one line |
| Down | move cursor down one line |
| PgUp | move to previous page |
| PgDn | move to next page |
| Enter | move cursor to start of next field |

In operation, as the application is loaded a table is constructed with an entry for each group name encountered. The table entry contains the name of the group and basic status information, and also a pointer to each of the elements which comprise a group:

Decision tables—these are stored in a form which permits efficient interpretation;

The variable table—derived from the data dictionary—is a table of named fields. Each entry contains the field name, its starting location and length, and description of the data content (string, integer, date etc.);

The data buffer—this is used to hold the current input or output record (which is assumed to conform to the corresponding data dictionary definitions).

When processing begins the input and output files are initialized, and the first record from the input file is read into the data buffer belonging to the first group.

Decision table processing is performed for the first table for this group, and from then on all processing is a defined by the user in the tables.

A full range of facilities is available to the user at this point, including:

Fields in the buffer can be verified to ensure that they conform to the format defined in the data dictionary, Other decision tables may be called (up to 50 levels of nesting), Other groups can be called, and data transferred between the associated buffers, Messages (error or information) may be written to the display or to a log file, Records may be written to the output file, Dialog sessions with the user may be activated.

When all processing for the input record has completed the next input record is read into the input buffer and the sequence is repeated. This continues until the input file is exhausted.

Probably the best way to describe the operation of IDSP is with a simple example: suppose it is desired to read a file of names and addresses and write to the screen those records with a postcode of 'P09 1SA' (where the postcode is in columns 74 to 80 of a file of 100-byte records called CUSTFILE.DAT) and the number of records displayed.

The control group is called CUSTSLCT and the input group CUSTRECD. IDSP is started then group CUSTSLCT is created and the DD editor used to define its record as containing a 4-byte field called COUNTER. The DT editor is used to set COUNTER to zero using the DR editor when the application starts, and to display its value when the application ends.

Next the group CUSTRECD is created and the DD editor used to define its record as
73 cols unused (ie., not used by this application)
9 cols contain a character field called POSTCODE
20 cols unused The DT editor is used next to create a decision table which checks field POSTCODE for 'P09 1SA' and if found displays the record and increments COUNTER. (Note—unused fields are given the name '.').

The operation of IDSP is as follows:

1. IDSP loads the application groups, starting with CUSTSLCT, and runs the control group's initialization routine to set COUNTER to zero.

2. The input file is read sequentially, each record being placed into the input group's data buffer before its corresponding processing routines are invoked.

3. At end of file the control group's end routine is called and the contents of COUNTER are displayed.

While the invention has been described with reference to a preferred embodiment, it will be understood by those skilled in the art that various changes can be made to the architecture without departing from the spirit and scope of the invention. Accordingly, the invention shall be limited only as specified in the following claims.

What is claimed is:

1. A method of generating a rules based end-user computer program on an interactive workstation having a display device, operation input means and a data store, comprising the computer-executed steps of:

entering identities of two or more input data format screens in said computer program on an input screen of said display device which screen provides a number of actions that can be taken with respect to each entered identity including establishing a panel for an input data format screen and establishing a plurality of rule entry screens associated with each input data format screen;

editing each panel for an input data format screen by means of the operator input means to define the formats of all permissible items of input data to the program; said editing step including creating and positioning fields for input data items within the panel layout and subsequently defining attributes of each input data item by means of a definition step which is separate from the step of creating and positioning of fields;

storing the edited input data formats in the data store;

displaying with respect to each data format screen a plurality of rule entry screens, each such screen in decision table format and including entry means for creating content in that format, each such screen being associated with one or more of the input data items;

editing each rule entry screen using the entry means to define rules related to the associated input data items as decision tables logically relating conditions and actions by means of a pattern of logic values;

storing the completed decision tables in the data store; and compiling the stored input data formats and decision tables to produce computer program code for run-time execution or interpretation.

2. A method as claimed in claim 1 including further steps of displaying and editing the format of output data files by execution of the program.

3. A method as claimed in claim 1 producing with the compiling step pseudo-code capable of execution of a run-time interpreter.

4. A method as claimed in claim 1 including the step of testing the generated program by running the compiled pseudo-code on an interpreter program which is resident in the workstation.

5. A method of generating on an interactive workstation having a display device, operator input means and a data store, a rules based data stream processor program for processing a stream of data records, said method comprising the computer-executed steps of:

displaying a plurality of input data format screens, corresponding to respective input data record types in a data stream, on the display device;

editing each input data format screen by means of the operator input means to define the formats of all permissible items of input data to the program, said editing step comprising defining length, position and attributes of fields within the data record to produce a data dictionary for the type of record;

storing the edited input data formats in the data store;

displaying a plurality of rule entry screens, each screen in decision table format and including entry means for creating content for the decision table, each such screen being associated with one or more of the input data items;

editing each rule entry screen using the entry means to define rules related to the associated input data items as decision tables logically relating conditions and actions by means of a pattern of logic values;

storing the completed decision tables in the data store; and compiling the stored input data formats and decision tables to produce computer program code for run-time execution or interpretation.

6. A method as claimed in claim 5 including the further steps of displaying and editing the format of output data files produced by execution of the program.

7. A method as claimed in claim 6 including displaying the output data files as a stream of output data records defining the length, position and attributes of fields within the output record to produce a data dictionary for that type of record.

8. A method as claimed in claim 7 including structuring the generated program as a series of groups, each group comprising a data dictionary which defines the format of a corresponding input or output data record, a data buffer which holds the current data record for the group and a set of decision tables defining the rules for processing the group at run-time.

9. A data processing system for generating a rules based end-user interactive computer program, the system comprising:

an interactive workstation having a display device, operator input means and a data store; and designer means in the workstation, the designer means including;

start panel generation means for providing a start panel on the display device for entry of identities of two or more data format screens, said start panel generation means including means for taking actions, using operator input means, with respect to the entries including establishing a panel for any listed identity of a data format screen, the established panel including selection option means;

panel editing means responsive to said selection option means on said established panel for enabling editing on the display via the operator input means to formate items of input data and for storing edited input data formats in the data store; said panel editing means including means for creating and positioning an input data field within a general panel layout and variable definition means for defining attributes of an input data-field separately from the step of editing on the display, means for generating rules panel on the display device each in decision table format, said rules panels including entry means for entry of content to the decision tables;

rules editing means responsive to said entry means for enabling editing on the display via the operator input means of a plurality of rules associated with one or more of the input data items and for storing the edited rules in the data store, the rules being displayed for editing and storage in said decision table format; and compiling means for compiling the stored input data formats and decision tables to produce computer program code for run-time execution or interpretation.

10. A data processing system as claimed in claim 9 in which the generated program is structured as a series of panels, each panel having as a minimum decision table associated with exit from the panel.

11. A data processing system as claimed in claim 10 in which panels associated with input data items also have associated with them data entry and data acceptance decision tables.

12. A data processing system as claimed in claim 9 in which the designer program further includes an output data file editor for editing the format of output data files produced by execution of the program for storing the edited output data file formats in data storage for compilation by the compiler along with the stored input data field attributes and decision tables.

13. A data processing system as claimed in 9 in which the compiler produces pseudo-code capable of execution by a run-time interpreter.

14. A data processing system as claimed in claim 13 which further includes such an interpreter program to permit testing of the generated program.

15. A data processing system for generating a rules based data stream processor program for processing a stream of input data records, the system comprising:
   an interactive workstation having a display device, operator input means and a data store; and
   designer means in the workstation, the designer means including;
   data format editing means for enabling editing on the display via the operator input means of the format of items of input data and for storing the edited input data formats in the data store; said data format editing means comprising means for displaying a data dictionary screen, corresponding to an individual input data record type and for editing the data dictionary screen to define the length, position and attributes of fields within the respective type of record;

means for generating rules panels each in decision table format form, said rules panels including entry means for entry of content to the decision tables;
   rules editing means responsive to said entry means for enabling editing on the display via the operator input means of a plurality of rules associated with one or more of the input data items and for storing the edited rules in the data store, the rules being displayed for editing and storage in said decision table format; and
   compiling means for compiling the stored input data formats and decision tables to produce computer program code for run-time execution or interpretation.

16. A data processing system as claimed in claim 15 in which the generated program also produces stream of output data records, the data format editor comprising means for displaying a data dictionary screen corresponding to an individual output data record type and for editing the data dictionary screen to define the length, position and attributes of the fields within the respective type of record.

17. A data processing system as claimed in claim 16 in which the generated program is structured as a series of groups, each group comprising a data dictionary which defines the format of a corresponding data record, a data buffer which holds the current data records for the group and a set of decision tables defining the rules for processing the group at run-time.

18. A data processing system as claimed in claim 17 in which the generated program is structured as a series of groups, each group comprising a data dictionary which defines the format of a corresponding data record, a data buffer which holds the current data record for the group and a set of decision tables defining the rules for processing the group at run-time.

* * * * *